United States Patent [19]

Berbalk

[11] Patent Number: 4,779,495
[45] Date of Patent: Oct. 25, 1988

[54] CRANKSHAFT CLAMPING SYSTEM

[75] Inventor: Hermann Berbalk, Göppingen, Fed. Rep. of Germany

[73] Assignee: Oerlikon-Boehringer GmbH, Göppingen, Fed. Rep. of Germany

[21] Appl. No.: 26,668

[22] PCT Filed: Jun. 24, 1986

[86] PCT No.: PCT/EP86/00367

§ 371 Date: Mar. 30, 1987

§ 102(e) Date: Mar. 30, 1987

[87] PCT Pub. No.: WO87/00466

PCT Pub. Date: Jan. 29, 1987

[30] Foreign Application Priority Data

Jul. 12, 1985 [DE] Fed. Rep. of Germany ....... 3524986

[51] Int. Cl.$^4$ .......................... B23B 33/00; B23Q 1/24
[52] U.S. Cl. ......................... 82/9; 82/38 R; 82/40 A
[58] Field of Search ............. 82/9, 38 R, 40 R, 40 A, 82/DIG. 6, DIG. 7

[56] References Cited

U.S. PATENT DOCUMENTS

| | | | |
|---|---|---|---|
| 1,704,702 | 3/1929 | Floeter | 82/9 |
| 2,125,074 | 7/1938 | Long | 82/DIG. 7 |
| 2,250,632 | 7/1944 | Groene | 82/9 |
| 2,451,705 | 10/1948 | Sanford | 82/9 |
| 3,246,549 | 4/1966 | Herman | 82/40 R |
| 4,122,877 | 10/1978 | Smith | 82/9 |

FOREIGN PATENT DOCUMENTS

| | | | |
|---|---|---|---|
| 0340429 | 9/1921 | Fed. Rep. of Germany | 82/9 |
| 3027477 | 2/1982 | Fed. Rep. of Germany | 82/9 |
| 2407048 | 5/1979 | France | 82/9 |
| 2058949 | 4/1981 | United Kingdom | 82/3 |
| 2070489 | 9/1981 | United Kingdom | 82/40 R |

Primary Examiner—Frederick R. Schmidt
Assistant Examiner—Blynn Shideler

[57] ABSTRACT

The apparatus according to the invention, for clamping crankshafts in working machines, is addressed to the problem of being able to clamp the workpieces in a defined position, reproducibly and without distortion, even in the case of different rough crankshaft forgings and varying clamping forces. This is made possible by clamping the workpiece not only between centers but also with two additional devices, the crankpins and cheeks of the workpieces being positioned by oppositely acting hydraulic plungers transversely of the long axis of the workpiece, while these two additional clamping devices are housed in a ring which rotates with the workpiece and which is supplied during rotation only through internally present energy accumulating systems.

5 Claims, 4 Drawing Sheets

CRANKSHAFT CLAMPING SYSTEM

BACKGROUND OF THE INVENTION

The invention relates to a clamping system for crankshafts and similar parts, on crankshaft working machines.

In clamping-up crankshafts and similar workpieces in machines for working them, especially when they have been forged or cast and have not yet been machined, the problem consists particularly in mounting them firmly in such a definite and reproducible manner that, in spite of the relatively small cross section of a crankshaft in comparison to its total length, no flexing or twisting of the crankshaft will occur in spite of the cutting forces and temperatures involved in the machining.

The manufacturing process most frequently employed at the present time is to work the crankshaft casting, before it is actually machined on a crankshaft cutting machine, at one or more cheek surfaces precisely defined with reference to the crankshaft axis of rotation, using a special machine for the purpose. In the subsequent process on the crankshaft cutting machine, the crankshaft is then clamped at the previously worked cheek surfaces by means of levers and faceplates, so that any inaccuracy of these surfaces with respect to the axis of rotation of the crankshaft results in a distortion of the crankshaft when it is clamped in the crankshaft working machine. This, together with the deformation of the crankshaft due to the cutting forces, expresses itself in an off-center position of the machined journal areas with reference to the crankshaft axis after it is unclamped. The disadvantage of this manner of proceeding consists mainly in the fact that the working of a crankshaft in this manner is very complicated and time-consuming, since on the one hand a special machine is needed for the production of the pre-cut clamping surfaces. Furthermore, it is found to be disadvantageous that, in the case of another necessary clamping-up for another series of operations, such as a finishing operation or clearance cutting operation, the crankshaft is put under tension because the crankshaft is deformed or distorted as a result of the preceding roughing operation, and thus the pre-cut clamping surfaces are no longer in the originally defined position with respect to the axis of rotation of the crankshaft. This error then has a negative effect accordingly on the subsequent machining accuracy. This necessitates greater machining allowances and hence increased cost in the next manufacturing operation, such as the grinding operation for example. Furthermore, the tension control that is essential in a clamping device of this kind, is not available.

The invention is therefore addressed to the task of creating a clamping device by which crankshafts which have not yet been machined on the journals and cheeks, can be clamped up in crankshaft processing machines in a defined position repeatably and without flexing the crankshaft, even in the case of slightly differing crankshaft forgings and varying clamping forces.

BRIEF SUMMARY OF THE INVENTION

This task is accomplished by an apparatus in which the clamping of the crankshaft is performed by three clamping devices operating independently of one another: With a first clamping device the crankshaft is clamped for rotation between centers along its axis of rotation. Second and third clamping devices, each hydraulically operated, are disposed in a ring which is disposed around the crankshaft and provided externally with teeth and driven. The feed of fluid for the hydraulic operation of the second and third clamping device is situated outside of the ring rotating with the crankshaft, and is performed during standstill through the automatic valves disposed at the end, through a coupling block which can be brought up against this end from without. During the rotation of the ring, however, there is no connection between the hydraulically operated clamping devices within the ring and the hydraulic pressure pump outside of the ring, so that the pressure needed for maintaining the clamping action has to be sustained by devices within the ring. This is accomplished by so-called hydroaccumulators which are in open connection to the parts of the hydraulic circuit that are located within the ring, and which upon each clamping action, which of course can take place only when the ring is at a standstill, are again placed under the clamping pressure, so that the springs of the hydroaccumulator which are thereby biased assure the maintenance of the pressure level within the ring after cutoff from the hydraulic pressure pump. To check the state of compression of the springs of the hydroaccumulator and hence the pressure level in the second and third clamping device, pins held clearance-free by springs are disposed between the spring of the hydroaccumulator and the outside surface of the ring, so that, by means of probes, the state of pressure of the hydraulically operated second and third clamping device can be sensed at the outside surface of the ring on the basis of the change in the position of the pin, thus making it possible to have an automatic emergency shutdown of the machine if the clamping pressure is too low. In addition to checking the clamping pressure, a check of the position of the hydraulically operated clamping slide of the second and third clamping device is provided by means of a sensing pin and by transmitting its change in position to the outside surface of the ring where it can be sensed by probes. This information, i.e., whether the clamping slides are loosely in contact with the workpiece with no pressure in the hydraulic clamping system or are fully withdrawn from the workpiece, can be obtained at any time, especially in the case of automatic workpiece changing, and together with the checking of the pressure in the hydraulic clamping system it represents a double check on the safety of the clamping system.

By the specific cooperation of the three clamping systems as regards sequence, clamping force and clamping direction, namely:

clamping of the crankshaft along its axis of rotation, rotatably, between the centers, by means of a first clamping device, by means of a second clamping device, pressing a crankpin, for example, with great force by means of a hydraulically operated clamping slider, against an abutment fixedly disposed in the ring bearing the second and third clamping device, additional application of various clamping sliders, aimed in part against one another, to different points on the crankshaft cheeks by means of a third hydraulic clamping device, many advantages are gained:

Rough crankshaft forgings, unworked except in the area of their mounting between centers, can be clamped up.

While the clamping between centers by the first clamping device is maintained, the second and third clamping devices can be released between individual working steps and retightened without the danger that the crankshaft will be tensed by possible deformation caused by a preceding machining operation.

Any distortion or twisting of the crankshaft by the clamping devices on account of easily varying workpiece contour or clamping forces is forestalled by the nature of the cooperation of the three clamping devices.

In spite of the production advantages of the separation of the clamping hydraulic system from the pressure pump in rotating clamping systems, the clamping force applied in the clamp-up remains.

The control systems for clamping pressure and clamping slider position permit a substantially automated operation of the crankshaft working machine and constitute an additional safety feature.

The clamping system can easily be converted to different workpieces by replacing the clamping sliders and varying the clamping pressures.

BRIEF DESCRIPTION OF THE DRAWING

An embodiment of the invention will be further described by way of exam with the aid of FIGS. 1 to 4, in which.

DETAILED DESCRIPTION OF PREFERRED EMBODIMENTS

Figure 3:
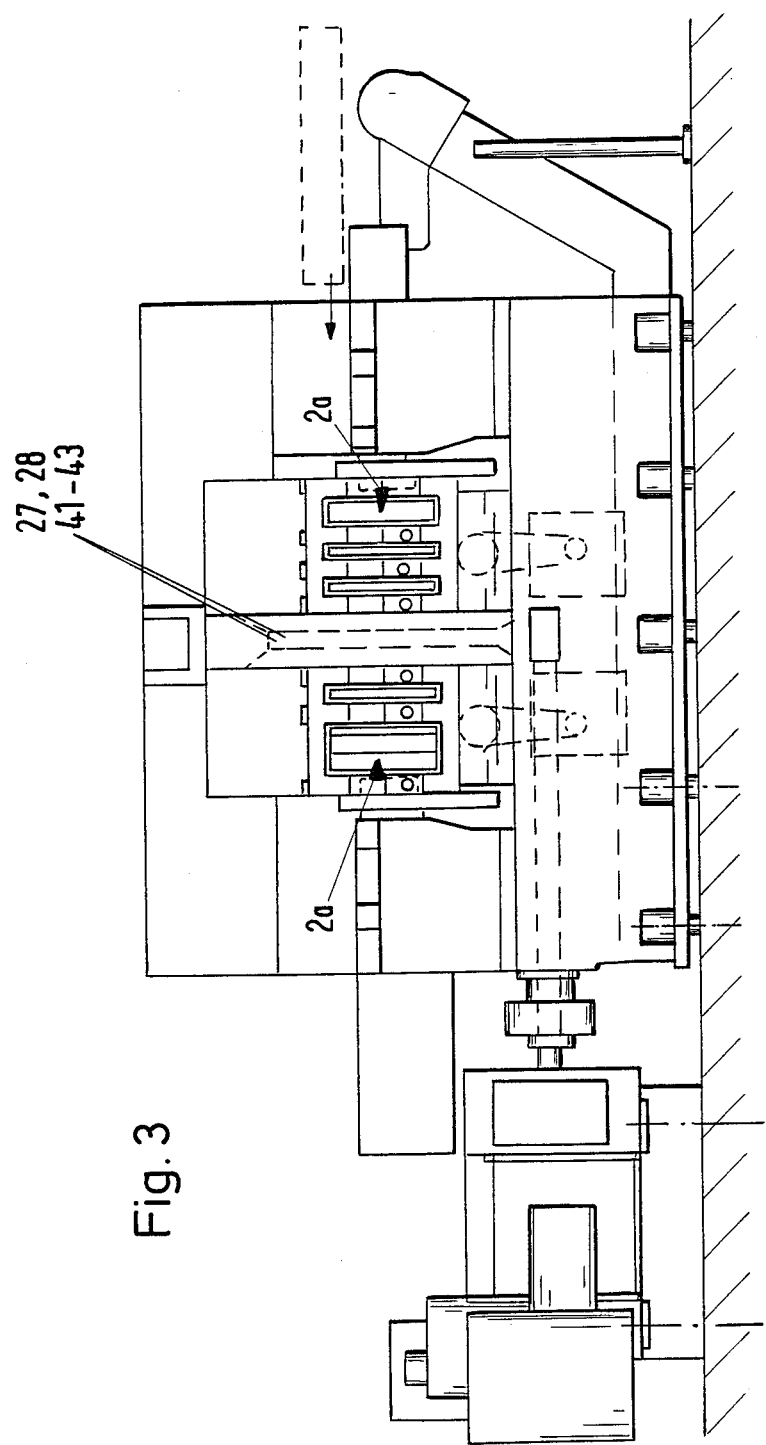
FIG. 3 is a side view of the crankshaft working machine of FIG. 2.
Figure 4:
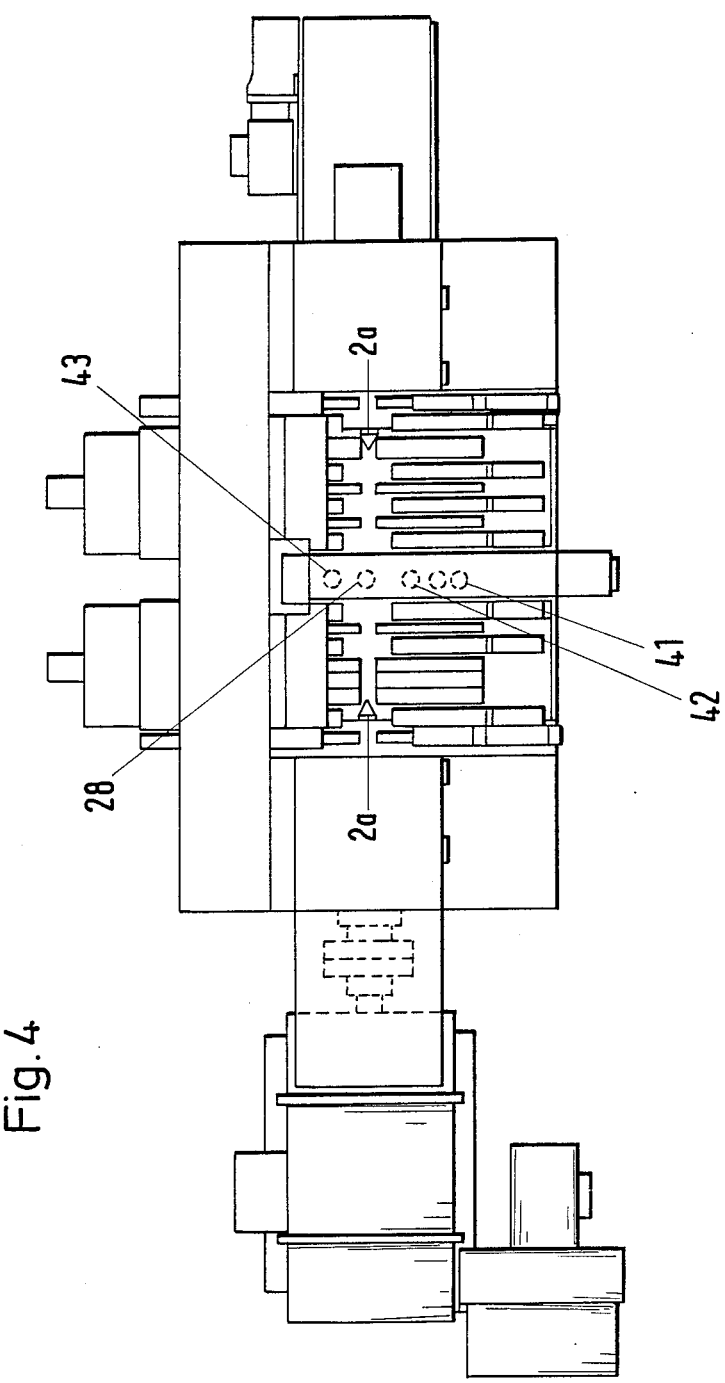
FIG. 4 is a top view of the crankshaft working machine of FIG. 2.

The crankshaft 1 inserted into the crankshaft working machine is held between centers 2a along its axis of rotation 2 by a first clamping device shown in FIGS. 3 and 4 such that the crankshaft 1 can swing about its axis of rotation 2.

By a second clamping device, the crankpin 3 situated at the bottom, or the cheek 4 situated at the bottom, is forced against an abutment 6. It comprises a clamping slider 5 which is driven by the wedge 11 when the hydraulically operated cylinder 10 is actuated. Since the crankshaft can rotate about its axis 2 because it is held by centers 2a in the first clamping device, when the second clamping device is tightened, no flexure is exerted on the crankshaft in spite of a very great clamping force.

After the position of the crankshaft with respect to the revolving ring 51 in which the second and third clamping systems are contained has been fixed, for the additional supporting of the crankshaft there is a third clamping device, to comprising tightening sliders 7, 8, 9 which are interconnected and by hydraulic fluid are forced against the crankshaft by feeding pressure to the cylinders 13, 17 and 18. Although the tightening sliders 7, 8 and 9 are aimed partially against one another, due to the inaccuracy of the rough crankshaft contour and the varying friction conditions in the hydraulics and in the tightening sliders, not all of the components of force cancel one another. The tightening forces applied by the third clamping device, however, are not so great that the remaining free force components are able to produce a change of position or twisting of the crankshaft despite the tightened second clamping device.

Since the pressure pumping system for the second and third clamping device is housed outside of the rotating housing ring 51, the hydraulic lines within the housing ring 51 are in communication with a hydraulic pump D only when the housing ring is at a standstill via the valves A, B and C. As soon as the corresponding connecting pieces are removed from the valves A, B and C from outside the housing ring 51, the clamping hydraulic system has no longer any connection to the outside and the housing ring 51 can rotate. To prevent any loosening of the clamping sliders 4, 7, 8 and 9 during the machining, the second and third clamping device have each a hydroaccumulator 19 and 20 which consists of a hydraulic fluid accumulator that is freely connected to the hydraulic lines and which is under the force of a spring 22, 21, which is biased by the pressure applied in the tightening of the corresponding tightening device. In this manner the pressure level is sustained in the hydraulically operated clamping devices also during the machining, i.e., with the pressure pumping system uncoupled.

The hydraulic liquid accumulators 19 and 20 are placed again under pressure in each clamping operation. For the release of the second and third clamping devices, the chamber in the cylinder behind each of the pistons 17, 18, 10 and 13 is placed under pressure, so that the pistons 17, 18, 10 and 13 are retracted and the hydraulic fluid leaves the housing ring 51 through the valves A and B.

For the control of the hydraulic pressure in the second and third clamping device, the state of tension of the springs 21 and 22 is determined and tranferred to the outside surface of the annular housing 50 through a change in the position of the pins 23 and 25 connected to the piston bottom of the hydroaccumulators 21 and 22, through the medium of the plungers 24 and 26 held clearance-free by springs. There they can be sensed by sensors 27 and 28 without contact even during the rotation of the annular housing 51.

In addition to the clamping pressure, the position of the clamping sliders 5, 7, 8 and 9 of the second and third clamping device is controlled. Sensing pins 31 and 30 held in a clearance-free manner by springs terminate in grooves 34, 32, or on the higher-placed outer surface of the tightening sliders 8 and 9, depending on whether the tightening sliders 8 and 9 are engaging the crankshaft or are retracted from it. This change in position is transmitted by levers 35 and 37 and plungers 38 and 40 held free of clearance, back to the outer surface of the annular housing 51 where they are sensed by probes 41, 42 and 43.

This double control not only constitutes an additional safety feature, but is necessary, especially in the case of automatic workpiece loading of the crankshaft working machine, in order to be sure that the workpiece has been loaded only with the clamping devices released and the clamping sliders retracted.

Figure 1:
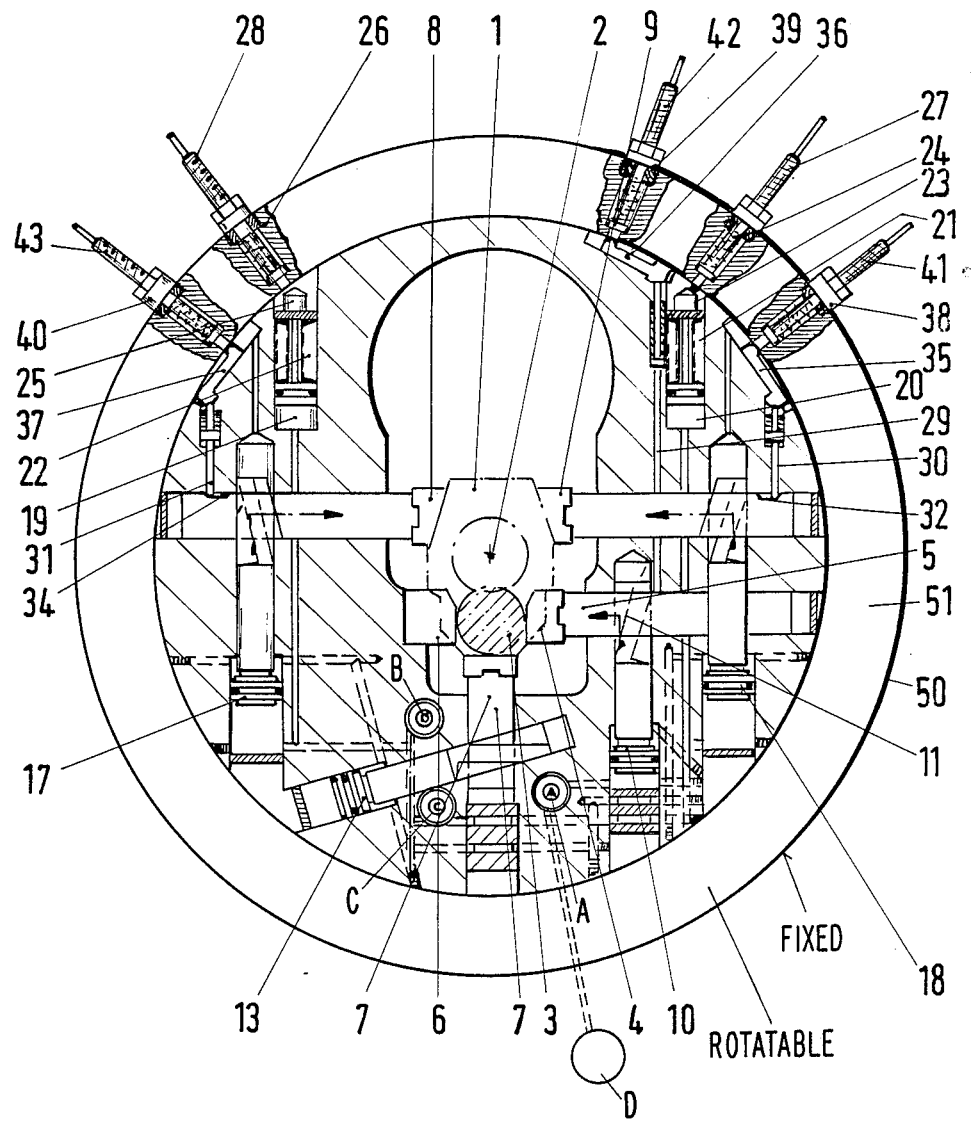
FIG. 1 is a cross-sectional view of the 2nd and 3rd clamping devices in the lengthwise direction of the crankshaft.
Figure 2:
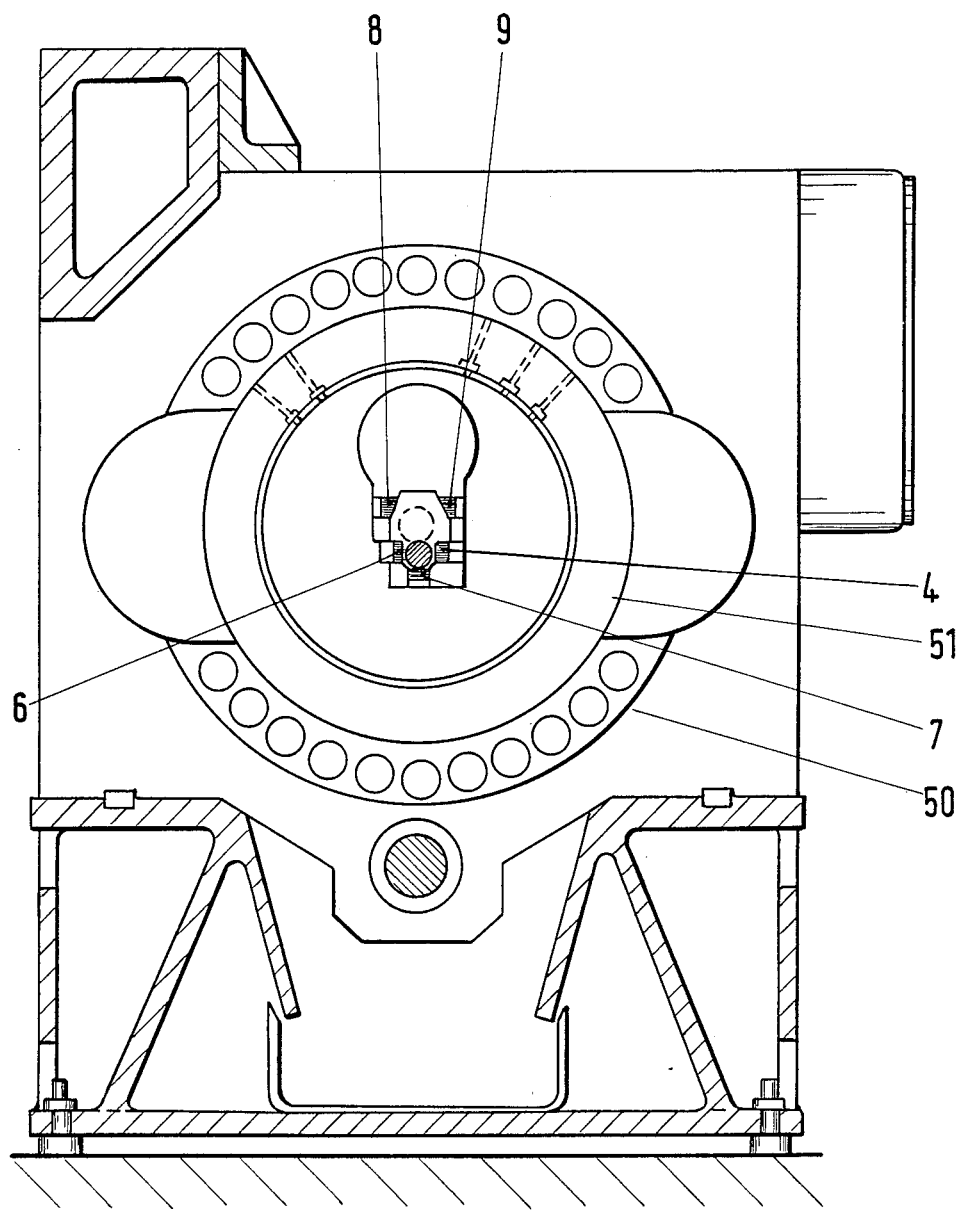
FIG. 2 is a view in the same direction of the clamping system installed in a crankshaft working machine.

In FIG. 2 is shown the revolving ring 51 with the second and third clamping device in the same viewing direction as in FIG. 1, partially in section, in use in a crankshaft working machine. FIGS. 3 and 4 show the same working machine in side view and top view, but in FIG. 3 the crankshaft rough forging is represented diagrammatically prior to insertion into the machine, while in FIG. 4 no workpiece is shown.

The first clamping device by which the crankshaft is held between 2a in the longitudinal direction is shown in both figures, as well as the probes 27, 28 and 41 to 43, represented in broken lines.

I claim:

1. A clamping system for clamping a crankshaft on a working machine, comprising:
   a first clamping device having centers for clamping the crankshaft such that the crankshaft is mounted for free rotation about the longitudinal axis of the crankshaft;
   a rotatable ring having an abutment with an abutment surface;
   a second clamping device comprising at least one hydraulically operable plunger reciprocably mounted in said ring perpendicular to said abutment surface, for pressing at least one crankpin of the crankshaft against said abutment surface, to thereby fix the position of the crankshaft relative to said ring;
   a third clamping device comprising at least three hydraulically operable plungers reciprocably mounted in said ring, at least two of said plungers of said third clamping device being directed against one another for pressing from opposite sides against at least one cheek of the crankshaft;
   a hydraulic pump operatively connected to said second and third clamping devices and mounted fixedly relative to said rotatable ring; and
   spring-loaded hydraulic fluid accumulators within said ring; said second and third clamping devices during rotation of said ring being without connection to said hydraulic pump, and pressure needed for clamping by said second and third clamping devices being supplied by said spring-loaded hydraulic fluid accumulators.

2. A clamping system according to claim 1, comprising means for placing said second and third clamping devices and the hydraulic fluid accumulators upon renewed clamping automatically under pressure of said hydraulic pump.

3. A clamping system according to claim 1, comprising sensors mounted outside said ring for determining during standstill of said rotatable ring and also during rotation of said ring, the clamping state of the second and third clamping devices.

4. A clamping system according to claim 1, comprising means for controlling clamping of the second clamping device in comparison to clamping of the third clamping device such that no change of position or twisting of the position established by the second clamping device be produced by the third clamping device.

5. A clamping system according to claim 1, wherein, by sustaining tightness of the first clamping device and maintaining the position of the abutment of the second clamping device, repeated loosening and tightening of the second and third clamping device is possible between machining operations, for permitting an automatic alignment of the crankshaft distorted by working forces and temperatures.

* * * * *